United States Patent
Kao

(10) Patent No.: US 11,687,389 B2
(45) Date of Patent: *Jun. 27, 2023

(54) MEMORY CRASH PREVENTION FOR A COMPUTING DEVICE

(71) Applicant: Uber Technologies, Inc., San Francisco, CA (US)

(72) Inventor: Shao-Hua Kao, Santa Clara, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,289

(22) Filed: May 31, 2022

(65) Prior Publication Data

US 2022/0291980 A1    Sep. 15, 2022

Related U.S. Application Data

(63) Continuation of application No. 17/176,935, filed on Feb. 16, 2021, now Pat. No. 11,379,283, which is a
(Continued)

(51) Int. Cl.
*G06F 11/00* (2006.01)
*G06F 11/34* (2006.01)
(Continued)

(52) U.S. Cl.
CPC ........ *G06F 11/008* (2013.01); *G06F 11/3037* (2013.01); *G06F 11/3419* (2013.01);
(Continued)

(58) Field of Classification Search
CPC ............... G06F 11/008; G06F 11/3037; G06F 11/3419; G06F 11/3433; G06F 11/0793;
(Continued)

(56) References Cited

U.S. PATENT DOCUMENTS 6,711,137 B1    3/2004  Klassen
7,370,336 B2    5/2008  Husain
(Continued)

FOREIGN PATENT DOCUMENTS

CN    103577306    2/2014
JP    2006-065857  3/2006
(Continued)

OTHER PUBLICATIONS

EESR in EP 19896269.8 dated Jul. 5, 2022.
(Continued)

*Primary Examiner* — Joseph D Manoskey
(74) *Attorney, Agent, or Firm* — Mahamedi IP Law LLP

(57) ABSTRACT

A computing device can monitor a set of memory usage metrics of the computing device. Based on the set of memory usage metrics, the computing device can determine whether memory usage will exceed a critical memory threshold within a future period of time. In response to determining that the memory usage will exceed the critical memory threshold within the future period of time, the computing device can degrade one or more application features of an application executing on the computing device.

20 Claims, 5 Drawing Sheets

Related U.S. Application Data continuation of application No. 16/220,419, filed on Dec. 14, 2018, now Pat. No. 10,977,105.

(51) Int. Cl.
*H04L 65/80* (2022.01)
*G06F 11/30* (2006.01)
*H04L 65/75* (2022.01)

(52) U.S. Cl.
CPC ........ *G06F 11/3433* (2013.01); *H04L 65/764* (2022.05); *H04L 65/80* (2013.01); *G06F 2201/81* (2013.01)

(58) Field of Classification Search
CPC ............. G06F 11/3051; G06F 11/3447; G06F 11/3452; G06F 11/3466; G06F 2201/81; H04L 65/764; H04L 65/80
See application file for complete search history.

(56) References Cited

U.S. PATENT DOCUMENTS

| | | | |
|---|---|---|---|
| 7,676,570 | B2 | 3/2010 | Levy |
| 7,948,906 | B1 | 5/2011 | Patel |
| 9,887,914 | B2 | 2/2018 | Bergman |
| 9,971,618 | B2 | 5/2018 | Lagergren |
| 10,101,910 | B1 | 10/2018 | Karpanen |
| 2003/0182411 | A1 | 9/2003 | Wang |
| 2004/0060044 | A1 | 3/2004 | Das et al. |
| 2004/0268078 | A1 | 12/2004 | Hassan |
| 2005/0246701 | A1 | 11/2005 | Kanapathipillai |
| 2006/0026270 | A1 | 2/2006 | Sadovsky |
| 2006/0059023 | A1 | 3/2006 | Mashinsky |
| 2006/0156140 | A1 | 7/2006 | Van Haegendoren |
| 2007/0006208 | A1 | 1/2007 | Nguyen |
| 2007/0136402 | A1 | 6/2007 | Grose |
| 2008/0052677 | A1 | 2/2008 | Wolf |
| 2008/0168244 | A1 | 7/2008 | Chu Chen |
| 2008/0288767 | A1 | 11/2008 | Wang |
| 2008/0301504 | A1 | 12/2008 | Chen |
| 2009/0083111 | A1 | 3/2009 | Carr |
| 2009/0089699 | A1 | 4/2009 | Saha |
| 2009/0144827 | A1 | 6/2009 | Peinado |
| 2009/0164115 | A1 | 6/2009 | Kosakowski |
| 2009/0222810 | A1 | 9/2009 | Walston |
| 2010/0306355 | A1 | 12/2010 | Lagergren |
| 2011/0078680 | A1 | 3/2011 | Lagergren |
| 2011/0119370 | A1 | 5/2011 | Huang |
| 2011/0307879 | A1 | 12/2011 | Ishida |
| 2011/0320794 | A1 | 12/2011 | Yang |
| 2012/0092277 | A1 | 4/2012 | Momchilov |
| 2012/0191394 | A1 | 7/2012 | Uzelac |
| 2012/0236713 | A1 | 9/2012 | Kakadia |
| 2012/0266169 | A1 | 10/2012 | Lagergren |
| 2013/0036237 | A1 | 2/2013 | Mutisya |
| 2013/0054819 | A1 | 2/2013 | Goldfein |
| 2013/0254742 | A1* | 9/2013 | Hockings ............ G06F 11/3409 717/120 |
| 2013/0278440 | A1 | 10/2013 | Rubin |
| 2013/0278442 | A1 | 10/2013 | Rubin |
| 2013/0278443 | A1 | 10/2013 | Rubin |
| 2013/0279392 | A1 | 10/2013 | Rubin |
| 2013/0279393 | A1 | 10/2013 | Rubin |
| 2013/0279491 | A1 | 10/2013 | Rubin |
| 2013/0279695 | A1 | 10/2013 | Rubin |
| 2013/0281140 | A1 | 10/2013 | Rubin |
| 2013/0281141 | A1 | 10/2013 | Rubin |
| 2013/0282267 | A1 | 10/2013 | Rubin |
| 2013/0282271 | A1 | 10/2013 | Rubin |
| 2013/0282277 | A1 | 10/2013 | Rubin |
| 2013/0282357 | A1 | 10/2013 | Rubin |
| 2013/0293394 | A1 | 11/2013 | Rubin |
| 2013/0346796 | A1 | 12/2013 | Niwa |
| 2014/0040605 | A1 | 2/2014 | Futral |
| 2014/0096126 | A1 | 4/2014 | Gourlay et al. |
| 2015/0149610 | A1 | 5/2015 | Jhanb |
| 2015/0222536 | A1 | 8/2015 | Bergman |
| 2015/0363113 | A1* | 12/2015 | Rahman ................ G06F 9/5016 711/170 |
| 2016/0036722 | A1 | 2/2016 | Obrecht |
| 2016/0070633 | A1 | 3/2016 | Abraham |
| 2016/0224426 | A1 | 8/2016 | Holden |
| 2016/0285714 | A1* | 9/2016 | He ...................... G06F 11/0757 |
| 2016/0337426 | A1 | 11/2016 | Shribman |
| 2017/0041201 | A1 | 2/2017 | Ilyadis |
| 2017/0104629 | A1 | 4/2017 | Holden |
| 2017/0116065 | A1 | 4/2017 | Holden |
| 2018/0129537 | A1 | 5/2018 | Kurtzman |
| 2019/0044805 | A1 | 2/2019 | Cobb |
| 2019/0243697 | A1 | 8/2019 | Holden |
| 2020/0142747 | A1* | 5/2020 | Wright .................. G06F 9/5016 |
| 2021/0135941 | A1 | 5/2021 | Cobb |
| 2022/0027223 | A1 | 1/2022 | Holden |

FOREIGN PATENT DOCUMENTS

| | | |
|---|---|---|
| JP | 2014-052867 | 3/2014 |
| WO | WO0079390 | 12/2000 |

OTHER PUBLICATIONS

International Search Report and Written Opinion in PCT/US2016/016437 dated Jun. 13, 2016.
International Search Report and Written Opinion in PCT/US2016/056784 dated Jan. 18, 2017.
IPRP in PCT/US2016/016437 dated Aug. 17, 2017.
1st Examination Report in AU2016215297 dated Sep. 18, 2017.
IPRP in PCT/US2016/056784 dated Apr. 26, 2018.
Second Examination Report in AU2016215297 dated May 10, 2018.
Third Examination Report in AU2016215297 dated May 15, 2018.
EESR in EP 16747223.2 dated Aug. 3, 2018.
Fourth Examination Report in AU2016215297 dated Sep. 18, 2018.
1st Examination Report in AU2016339974 dated May 31, 2019.
1st Examination Report in AU2018232915 dated Nov. 12, 2019.
ISR and Written Opinion in PCT/US2019/058526 dated Jan. 22, 2020.
2nd Examination Report in AU 2018232915 dated May 4, 2020.
Pre-Examination Office Action in BR 1120180073652 dated Aug. 27, 2020.
IPRP in PCT/US2019/058526 dated Jun. 24, 2021.

* cited by examiner

MEMORY CRASH PREVENTION FOR A COMPUTING DEVICE

This application is a continuation of U.S. patent application Ser. No. 17/176,935, filed on Feb. 16, 2021; which is a continuation of U.S. patent application Ser. No. 16/220,419, filed on Dec. 18, 2018 (now U.S. Pat. No. 10,977,105 issued Apr. 13, 2021; the aforementioned applications being hereby incorporated by reference in their entireties.

BACKGROUND

Out of memory (OOM) events occur on computing devices when little or no additional memory can be allocated for use by the operating system, applications, or other programs. The result of such a condition can cause applications to cease functioning properly or cause the application to crash.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
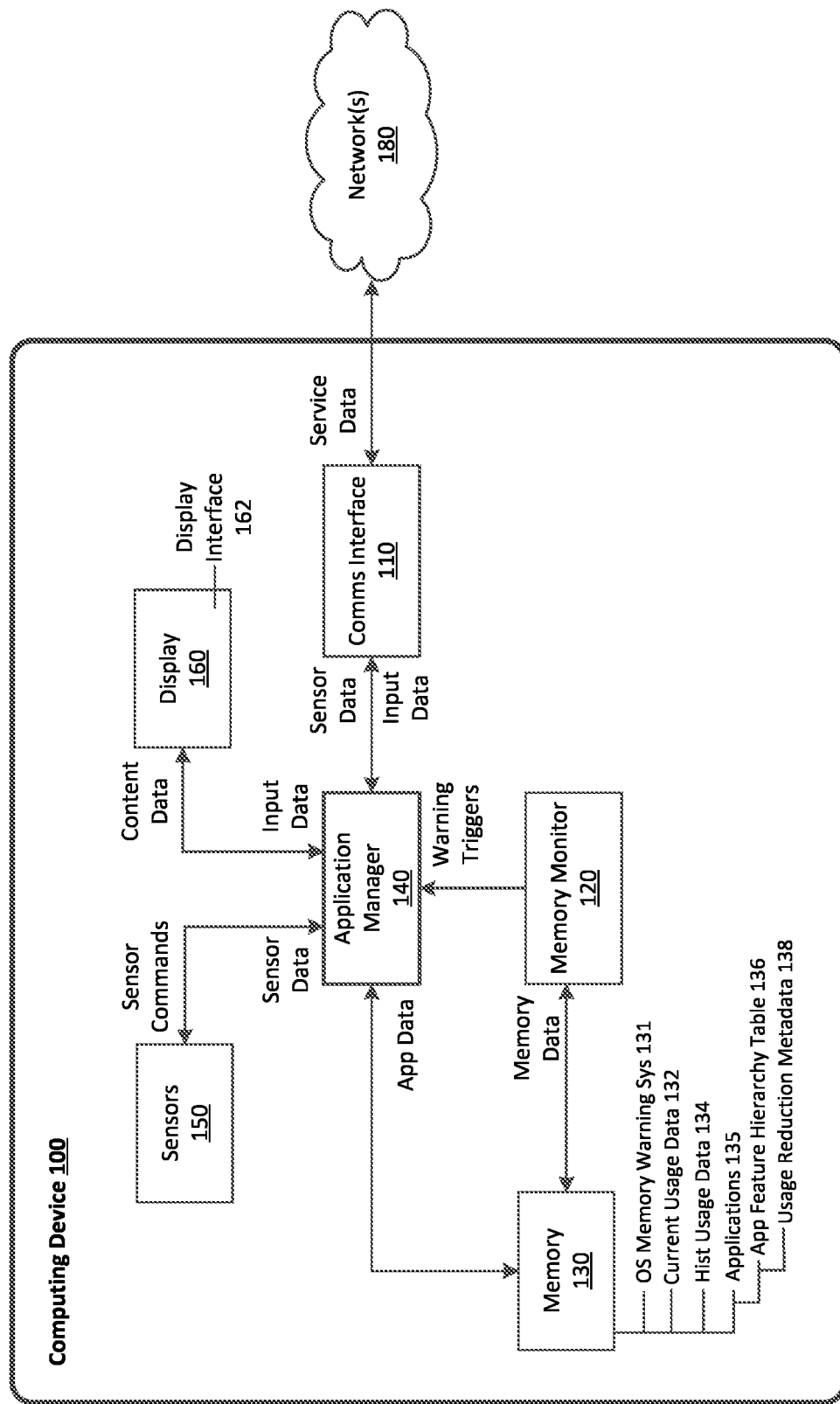
FIG. 1 is a block diagram illustrating an example computing device implementing memory management and crash prevention techniques, in accordance with examples described herein.

A computing device can monitor a set of memory usage metrics of the computing device. For example, the computing device may be executing one or more applications that include or display features or perform operations requiring extensive memory usage. In some examples, based on historical memory usage data and the set of memory usage metrics, an application running on the computing device (or a system or operating system of the computing device, in another implementation) (referred to herein as the computing device, for purposes of simplicity) can determine or predict whether future memory usage will exceed a critical memory threshold. In response to determining that the future memory usage will exceed the critical memory threshold, the computing device can degrade and/or deactivate one or more application features of the application.

In various implementations, the executing application can comprise a set of features, each of which can be associated with one or more hierarchical tier levels. For example, a particular application feature can be essential to the functioning of the application, and can be assigned a highest tier. The highest tiered application features can be protected from deactivation or suspension, but as described below, may be classified as available for degradation. In certain examples, these highest tier application features can be excluded from degradation and/or deactivation by the computing device. Other features can be classified in one or more non-essential tiers, making such features available for degradation and/or deactivation.

According to examples described herein, the application features can further be classified into subcategories (e.g., as a metadata tag for each feature) indicating whether the feature is available for deactivation, degradation and deactivation, degradation only (e.g., and levels of degradation), neither deactivation nor degradation. As used herein, "degradation" of an application feature can comprise reducing a content render rate of the feature (e.g., for streaming or updating content), expanding tiles (e.g., reducing display resolution by a target percentage), reducing a data transfer rate (e.g., increasing location data updating periods), and the like. As further provided herein, "deactivation" of an application feature can comprise eliminating the feature from current usage (or suspend the feature from current usage for a duration of time) on the application to free up the current memory usage of that feature.

In various examples, the computing device can include memory monitoring functionality that monitors a set of memory metrics of the computing device. In one aspect, the computing device dynamically monitors a current memory usage by the executing application. The computing device can further determine the system free memory of the computing device, and/or the amount of total memory the computing device contains. In further implementations, the computing device can dynamically determine a ratio of the total free memory versus current memory usage of the executing application. In still further implementations, the computing device can store historical data indicating historical memory usage for the executing application, and monitor a predetermined period of current memory usage (e.g., the previous five seconds of memory usage by the application).

According to examples described herein, the computing device can project a future memory usage for the executing application based on the predetermined period of current memory usage and the historical memory usage of the application. For example, the computing device can determine whether the executing application will exceed a critical memory usage threshold within the next thirty seconds. Additionally or alternatively, the computing device can leverage third-party memory warning systems, such as operating system (OS) integrated memory warning systems included with the computing device. Such third-party warning systems can provide low memory warnings that cause the computing device to perform a first set of memory usage reduction actions, such as closing background applications not currently in use. In addition, the computing device can log each memory warning from the OS memory warning system to determine a memory pressure level for the executing application.

In various examples, threshold numbers of low memory warnings from the OS memory warning system over a given time can be established by the computing device as tiered memory pressure levels for the executing application. For example, three memory warnings within the previous one minute can comprise a high memory pressure level, and five memory warnings within the previous minute can comprise a critical memory pressure level. Each memory pressure level can trigger the computing device to perform a respective set of memory usage reduction actions for the executing application. For example, when the high memory pressure threshold is met or exceeded, the computing device can begin to degrade and/or deactivate a lower tiered set of application features (e.g., non-essential features). If the critical memory pressure threshold is met, the computing device can aggressively degrade and/or deactivate additional application features (e.g., higher tiered application features) to prevent an out-of-memory (OOM) state for the computing device.

Additionally or alternatively, the computing device can predict a future memory usage based on historical application usage data and a brief period of application usage (e.g., the previous five seconds), and determine whether the predicted future memory usage will exceed a particular memory pressure level. Thus, the tiered memory reduction triggers can be based on the prediction by the computing device. For example, based on a memory usage projection from historical data and current usage data, the computing device can predict that a third-tier memory pressure level will be exceeded in the next twenty seconds. In response to this prediction, the computing device can preemptively implement memory usage reduction actions to prevent the third-tier memory threshold level from being exceeded in the first place. As an example, the computing device can perform a lookup of third-tier application features and the corresponding memory reduction actions to perform on such features, and then preemptively implement the memory reduction actions accordingly.

In various implementations, the computing device can monitor the memory metrics to dynamically determine whether a first-tier memory pressure threshold is exceeded. If so, the computing device can perform first-tiered memory usage reduction actions for an executing application. The computing device can further determine whether a second-tier, more critical, memory pressure threshold is exceeded. If so, the computing can perform second-tiered memory usage reduction actions for the executing application. It is contemplated that the computing device can establish any number of tiers for memory pressure levels, and can further perform any number of tiers of corresponding memory usage reduction actions. It is further contemplated that each tier of memory pressure level can correspond to a particular tier of memory usage reduction actions. Furthermore, each tier of memory usage reduction actions can correspond to a set of application features, which can be selectively degraded or deactivated in response to the corresponding memory pressure level being exceeded.

As an example, the executing application can comprise a navigation application comprising highest tiered features such as live map content, a guided trajectory overlaying the map content, updates to the trajectory, and the like. Certain features of the highest tier can be excluded from degradation, such as the guided trajectory feature, where the map content may be available for degradation (e.g., reduction of content rendering). The navigation application features can further include non-essential features, such as voiced instructions to prepare for upcoming turns and to follow the guided trajectory, traffic alerts, overlaid indicators for fueling or charging stations, restaurants, points of interest, and non-essential buttons or selectable features. In one example, the application can further include non-essential, memory-intensive features, such as streaming or near-continuously updating data (e.g., surge pricing regional indicators for transport service applications utilized by transport providers).

As the computing device receives memory warnings, a first memory pressure level may be exceeded. In response to the first memory pressure level being exceeded, the computing device can identify a first set of application features of the navigation application, and a set of memory reduction actions to perform on the first set of application features. For example, the memory reduction action for each application feature of the first set of application features can be identified in metadata as either degradation or deactivation, and can further define the manner in which the feature is to be degraded (e.g., reduce a map content render rate by 20%).

Once this first set of memory reduction actions has been performed on the executing application, the computing device can continue to monitor the memory metrics, and/or monitor warnings issued by the OS memory warning system. If a second memory pressure threshold is exceeded, the computing device can determine a second set of application features, and a set of memory reduction actions to perform on the second set of application features. It is to be noted that the second set of application features can include application features from the first set (e.g., as degraded features). Furthermore, the memory reduction action for each of the second set of application features can be determined and implemented by the computing device. These actions can include degradation, further degradation (e.g., for features in the first set as well as the second set), and deactivation.

The computing device can continue to monitor the memory metrics for additional memory pressure thresholds being exceeded. Accordingly, for each exceeded memory pressure threshold, the computing device can look up a corresponding set of application features for the executing application, and also a corresponding set of memory reduction actions to perform on those application features. Thus, for the executing application, each feature can be listed in a database or logical table, each feature can be associated with one or more tiers for memory reduction, and for each listed tier, each feature can be associated with a memory reduction action (e.g., degradation, degradation level, or deactivation).

In one example, the executing application can comprise a transport service application utilized by transport providers of a network-based transport service for a given region. The transport service application can include various memory-intensive features that require continuous or near continuous updating. Such features include map content, transport invitation notifications, timers for accepting or declining transport invitations, navigation content (e.g., a turn-by-turn trajectory overlaying the map content), voiced turn-by-turn instructions, selectable buttons or menu items, selectable map features (e.g., information content for points of interest), and the like. The features can further include a dynamic pricing feature that provides the transport provider with information on map content that indicates high demand areas for the transport service. This dynamic pricing feature requires near continuous updating based on supply-demand data for the transport service, and further includes rendering overlaid content on the map data (e.g., color-coded shading over sub-regions having high transport demand, a surge pricing multiplier feature, etc.).

In such an example, the computing device can store a tiered table listing each tier of application features for the transport service application. Furthermore, the table can further list corresponding memory pressure levels for each application feature, and a corresponding memory reduction action to be performed when that memory pressure threshold is exceeded. For example, the dynamic pricing feature of the transport service application can be associated with multiple tiers, each succeeding tier indicating degradation actions to be performed, with a final tier indicating deactivation of the dynamic pricing feature. When a first memory pressure threshold level is exceeded, the computing device can perform a lookup in the table, identify the dynamic pricing feature in the first set of application features, and determine a memory reduction action to perform on the dynamic pricing feature (e.g., reduce a content render rate). When a nth memory pressure threshold level is exceeded, the computing device can perform a lookup in the table for the nth tiered set of application features and the corresponding memory reduction actions to perform on those application features.

Among other benefits, examples described herein achieve a technical effect of reactively and/or preemptively resolving low or out-of-memory conditions for a computing device by implementing highly granular application feature degradation for a target application executing on the computing device. Such examples can implement predictive functionality as well as leveraging current low memory warning techniques to optimize the performance of the target application given current or predicted memory conditions.

As used herein, a computing device refers to devices corresponding to desktop computers, cellular computing devices and/or smartphones, personal digital assistants (PDAs), laptop computers, virtual reality (VR) or augmented reality (AR) headsets, tablet computing devices, etc., that can provide network connectivity and processing resources for communicating with the system over a network. A computing device can also correspond to custom hardware, in-vehicle devices of automobiles, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example computing device 100 implementing memory management and crash prevention techniques, in accordance with examples described herein. The computing device 100 can include a set of sensors 150 (e.g., positioning system, IMU, camera, microphone, touch sensors, ambient light sensor, etc.) and a display 160 generating a display interface 162 for an executing application 135. The computing device 100 can further include a communication interface 110 that connects the computing device 100 with one or more networks 180. The computing device 100 can further include a memory monitor 120 and application manager 140. The memory monitor 120 can continuously or periodically monitor a set of memory metrics (e.g., current usage data 132 and/or historical usage data 134) for memory 130 of the computing device 100.

The application manager 140 can execute applications 135 in response to input data from a user. The memory 130 can store a set of applications 135. For certain applications 135, the memory 130 can further store an application feature hierarchy table 136 listing each application feature in a tiered hierarchy corresponding to memory pressure threshold levels. The application feature hierarchy table 136 can include memory usage reduction action metadata 138 indicating the memory reduction actions to be performed for each application feature at each hierarchical tier (e.g., no action, degradation, degradation level, deactivation).

In various implementations, the memory 130 can collect and store historical memory usage data 134 specific to the executing application 135. For example, the historical usage data 134 can indicate the memory usage of the executing application for a predetermined period of time prior to the present (e.g., thirty seconds). In contrast, the current usage data 132 can correspond to a shorter amount of time prior to the present (e.g., five seconds). Based on the historical memory usage data 134 and the current usage data 132 for the executing application, the memory monitor 120 can determine whether memory usage for the computing device 100 will exceed a critical memory threshold at a future instance in time (e.g., thirty seconds in the future). As provided herein, the critical memory threshold can correspond to an impending out-of-memory crash on the computing device 100.

The memory monitor 120 can utilize the memory metrics to predict whether a particular memory pressure threshold will be exceeded, and issue warning triggers—indicating a current or predicted memory threshold being exceeded—to the application manager 140 accordingly. In various examples, the memory metrics can comprise the current system free memory of the computing device 100, and the amount of total memory that the computing device 100 contains. In further implementations, the computing device 100 can dynamically determine or otherwise predict a ratio of the total free memory versus current memory usage of the computing device 100. If the current or predicted ratio exceeds a first threshold (e.g., a first warning trigger by the memory monitor 120), then the application manager 140 can perform a lookup in the hierarchy table 136 for the first set of features on which to implement memory reduction actions. If the ratio exceeds a second threshold, application manager 140 can perform a second lookup in the hierarchy table 136 for a second set of application features on which to implement memory reduction actions, and so on and so forth down the hierarchy. Accordingly, based on the level of warning trigger from the memory monitor 120, the application manager 140 can perform a lookup in the application feature hierarchy table 136 of the executing application for a corresponding set of application features, and then implement the set of memory usage reduction actions indicated in the memory usage reduction action metadata 138 for those features.

As described herein, the memory monitor 120 can also leverage the functions of an OS memory warning system 131 of the computing device 100, which can issue reactive warnings to the memory monitor 120 based on the current memory conditions. In certain aspects, the memory monitor 120 can utilize these warnings to determine a memory pressure warning level for the executing application 135. In variations, the memory monitor 120 can utilize the reactive warnings from the OS warning system 131 to predict whether the computing device 100 will exceed a particular memory pressure threshold of multiple memory pressure thresholds at a future instance in time (e.g., thirty seconds in the future). In doing so, the memory monitor 120 can determine a number of reactive memory warnings from the OS memory warning system 131 for the computing device 100 as a whole, the current usage data 132 for the target executing application 135, and historical usage data 134 for that application. Based on these factors, the memory monitor 120 can predict or otherwise determine a memory pressure threshold level—of the multiple memory pressure levels—that will be exceeded, and submit a corresponding warning trigger to the application manager 140.

In response to a warning trigger from the memory monitor 120 indicating that the memory usage will exceed a particular memory threshold at the future instance in time (e.g., a critical memory threshold indicating an imminent crash), the application manager 140 can degrade one or more application features of the executing application 135. For example, the application manager 140 can perform a lookup in the application feature hierarchy table 136 of the executing application 135 to identify a set of application features for degradation and/or deactivation (e.g., a tiered set of features that correspond to the memory pressure threshold determined by the memory monitor 120). In certain implementations, the hierarchy table 136 can include a listing of application features and usage reduction metadata 138 tagged to each feature to indicate which particular memory reduction action to implement for each application feature.

It is contemplated that the application manager 140 can comprise a component of the executing application 135 itself, or can comprise a component of the operating system executing on the computing device 100. Thus, the functions of the application manager 140 described herein can be configured by the operating system to monitor and manage memory of any application executing on the computing device 100, or can comprise a monitoring and management component of any individual application executing on the computing device.

As described herein, the executing application 135 in which the application manager 140 focuses degradation, can comprise a content streaming application (e.g., video or music streaming), a mapping and/or navigation application, a social media application, a news content application, a marketplace or sales application, and the like. In certain examples, the application manager 140 can comprise a built-in management program of the executing application 135, enabling the application developer to create the application feature hierarchy table 136. Such an arrangement enables the application developer to prioritize which features are essential, which features are essential but may be degraded, and which features are not essential and may be degraded and/or deactivated.

In certain aspects, the memory monitor 120 can issue hierarchical warnings to the application manager 140. For example, a first hierarchical warning can comprise a lower tiered memory usage warning, and can cause the application manager 140 to only degrade a first set of non-essential application features, and/or deactivate certain non-essential features. A next hierarchical warning from the memory monitor 120 can cause the application manager 140 to lookup a next hierarchical level of application features in the hierarchy table, and perform a set of memory reduction action on those features (e.g., as indicated in the usage reduction metadata 138 for those features within that hierarchical tier). A critical memory warning (e.g., indicating an impending out-of-memory crash) from the memory monitor 120 can cause the application manager 140 to look up a last tiered set of application features in the hierarchy table 136 and perform a final, most aggressive set of memory usage reduction actions on those features.

Examples of memory reduction actions can comprise reduction of resolution of content data to be presented on a display interface 162 of the display screen 160 (e.g., expanding or joining pixels or display tiles). Such actions can further include reducing a content render rate of a content stream or mapping content (e.g., from ten frames per second to five frames per second). Additionally or alternatively, the memory reduction actions can include reducing a sensor data transmission rate from the sensors 150 (e.g., transmitting position updates every eight seconds as opposed to every four seconds), or deactivate of certain sensors 150. In certain examples, the application manager 140 can also reduce a service data update rate received from a datacenter of the networks 180. For example, under normal memory conditions, the service data may be updated every ten seconds. Such updates may indicate traffic condition updates, supply-demand updates for transport services, news feed updates, and the like. When a particular memory pressure threshold is exceeded, the application manager 140 can decrease the service data update rate to, for example, once every thirty seconds.

It is contemplated that such granular feature management for an application 135 can result in both the optimization of that application given current and/or predicted memory conditions of the computing device 100, and the prevention of an out-of-memory state for the computing device 100, which can cause multiple applications to function improperly. For example, memory-intensive applications—such as social media, navigation, and content streaming—can leverage the use of the memory monitor 120 and application manager 140 to significantly reduce the memory consumption of a target application 135 to alleviate high or critical memory conditions. The application 135 can include built-in application management functionality, which can utilize an application feature hierarchy table 136 and reduction metadata 138 described throughout the present disclosure to implement memory usage reduction techniques described herein.

Hierarchical Application Feature Table

Figure 2:
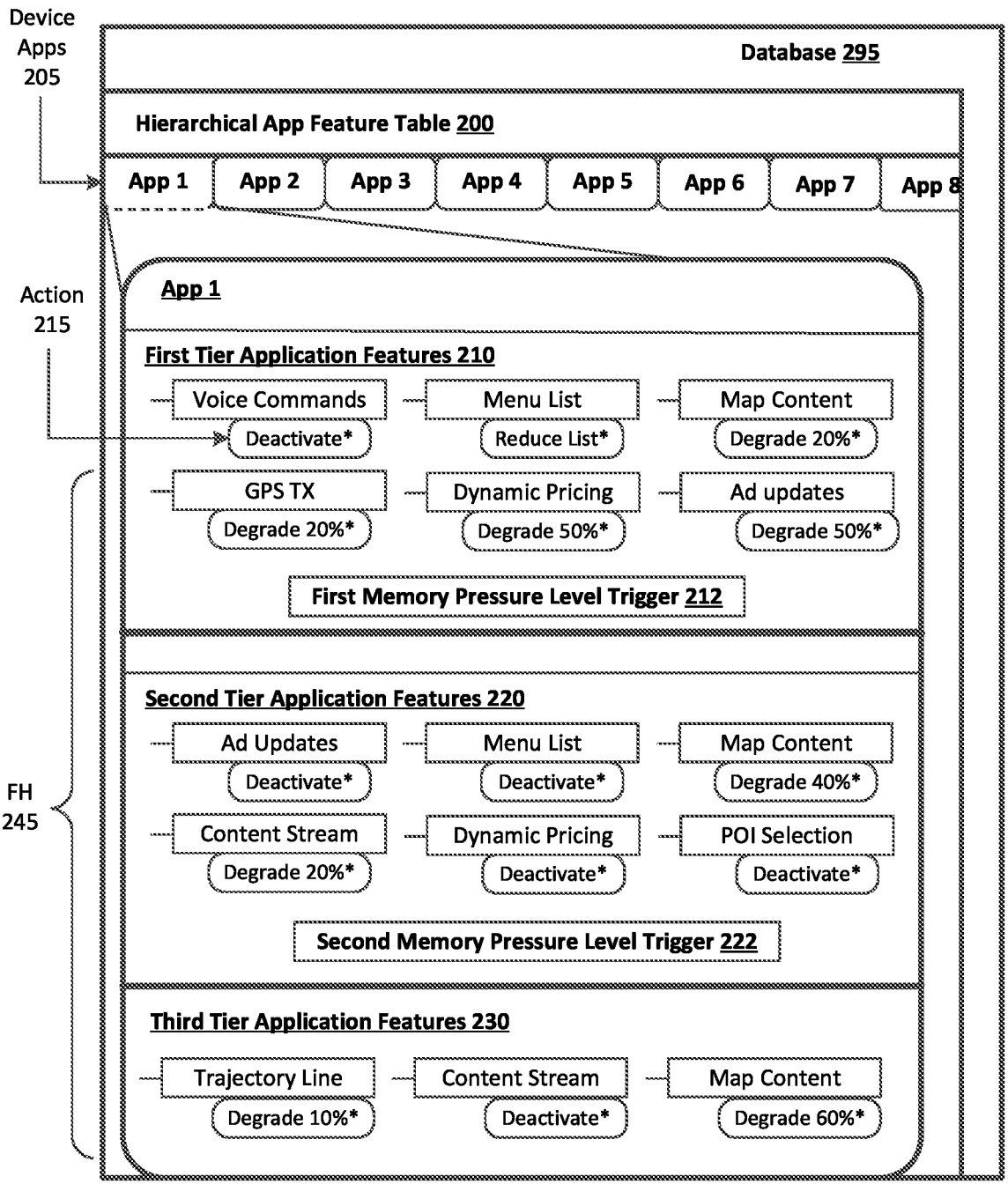
FIG. 2 depicts an example illustration of a hierarchical table of application features, according to examples described herein.

FIG. 2 depicts an example illustration of a hierarchical table 200 of application features, according to examples described herein. In the below description of FIG. 2, reference may be made to reference characters representing like features as shown and described with respect to FIG. 1. Referring to FIG. 2, the hierarchical table 200 can be stored in a database 295 of the computing device 100 and can correspond to the hierarchical table 136 described with respect to FIG. 1. In certain aspects, the hierarchical table 200 can be associated with a single application of the computing device 100, such as a navigation application, a transport service application, a content streaming application, and the like. In certain implementations, the hierarchical table 200 can include hierarchical feature tiers for multiple device applications 205, as shown in FIG. 2. For example, any of the listed applications 205 may be currently executing, or can be running as a background application when a certain memory pressure threshold is exceeded. In response to the threshold being exceeded, the computing device 100 can identify any of the currently executing applications 205, and perform lookups for respective tiered application features for that particular application.

As shown in FIG. 2, an executing application (App 1) can comprise numerous application features listed in a feature hierarchy 245 for memory reduction treatment when specified memory pressure thresholds are exceeded. In accordance with examples described herein, the memory monitor 120 can transmit a first memory pressure warning trigger 212 to the application manager 140. In response, the application manager 140 can perform a first lookup in the feature hierarchy table 200 for the executing application (App 1) to identify first tier application features 210 for memory usage reduction. In certain aspects, each of the first tier application features 210 can be associated with a memory reduction action 215 (e.g., in metadata) for the application manager 140 to perform.

With reference to FIG. 2, App 1 can comprise first tier features 210 comprising voice commands, a menu list, map content, GPS data transmission to a remote source, a dynamic pricing feature (e.g., for transport service applications), and an advertisement updating feature. The action tags 215 for each feature can instruct the application manager 140 to perform a specified memory reduction action on the feature. In the example shown, the memory reduction actions 215 comprise deactivation of the voice commands, a reduction of the menu list (e.g., eliminating low priority items), degradation of the map content (e.g., by 20%), degradation of GPS data transmission rate (e.g., reduced from once every four second to once every eight seconds), degradation of the dynamic pricing updates (e.g., by 50%), and degradation of ad updates (e.g., by 50%).

In response to a second, more critical memory pressure trigger 222, the application manager 140 can perform a lookup of second tier application features 220 and implement the respective memory reduction actions associated with each of the second tier application feature 220. It is to be noted that some of the first tier application features 210 are also listed in the second tier 220, but are associated a different, more aggressive memory reduction action. Furthermore, it is contemplated that the application manager 140 need not proceed down the feature hierarchy 245 sequentially. Rather, the memory monitor 120 may issue any memory pressure level warning 212, 222, corresponding to any tier of the hierarchical table 200 at any given time, and the application manager 140 can perform each of the memory reduction actions (e.g., deactivation actions) on any lower-tiered application features, and then perform the memory reduction actions on application features corresponding to the current memory pressure level warning.

For example, the memory monitor 120 may issue a highly critical, third level memory pressure warning, corresponding to the third tier application features 230 of App 1. In response, the application manager 140 can deactivate voice commands from the first tier 210, then deactivate the ad updates, menu list, dynamic pricing feature, and the point of interest selection feature from the second tier 220, and then finally perform the memory reduction actions on the third tier application features 230 (e.g., degrade the trajectory line by 10%, deactivate the content stream, and degrade the map content by 60%). As described herein, the feature hierarchy 240 can comprise any number of tiers, each corresponding to a particular memory pressure threshold, or memory pressure level trigger 212, 22, as shown in FIG. 2. It is contemplated that this hierarchical memory reduction treatment of a specified application can prevent out-of-memory crashes while optimizing the application given the current memory conditions of the computing device 100.

Figure 3:
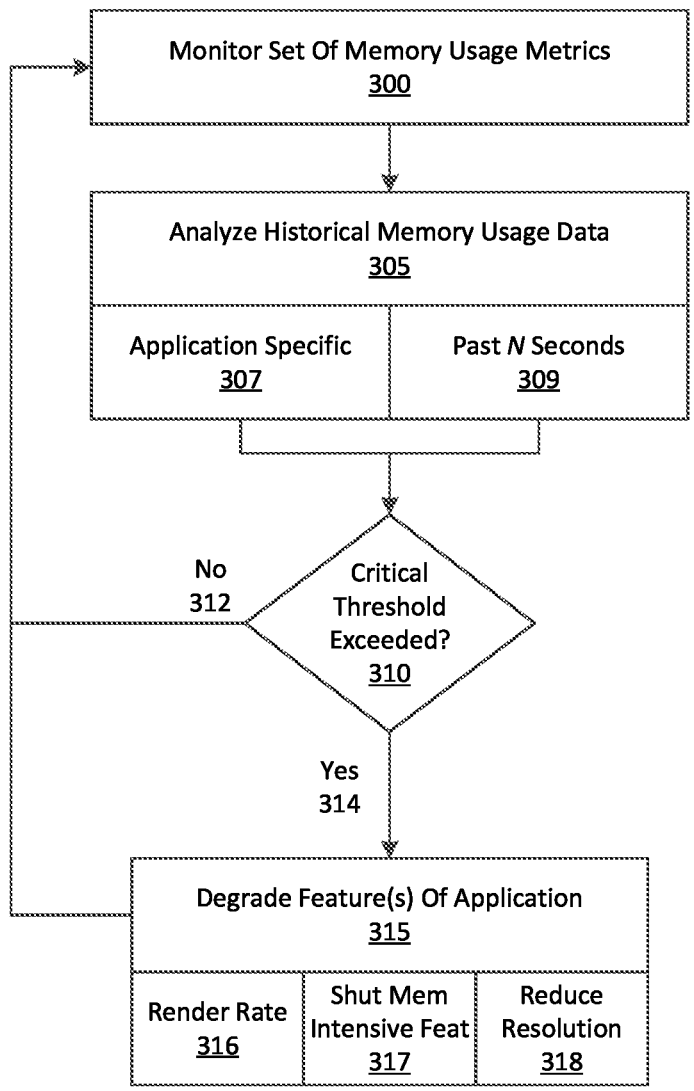
FIGS. 3 and 4 are block diagrams illustrating example methods of managing memory usage for an executing application on a computing device, according to examples described herein.
Figure 4:
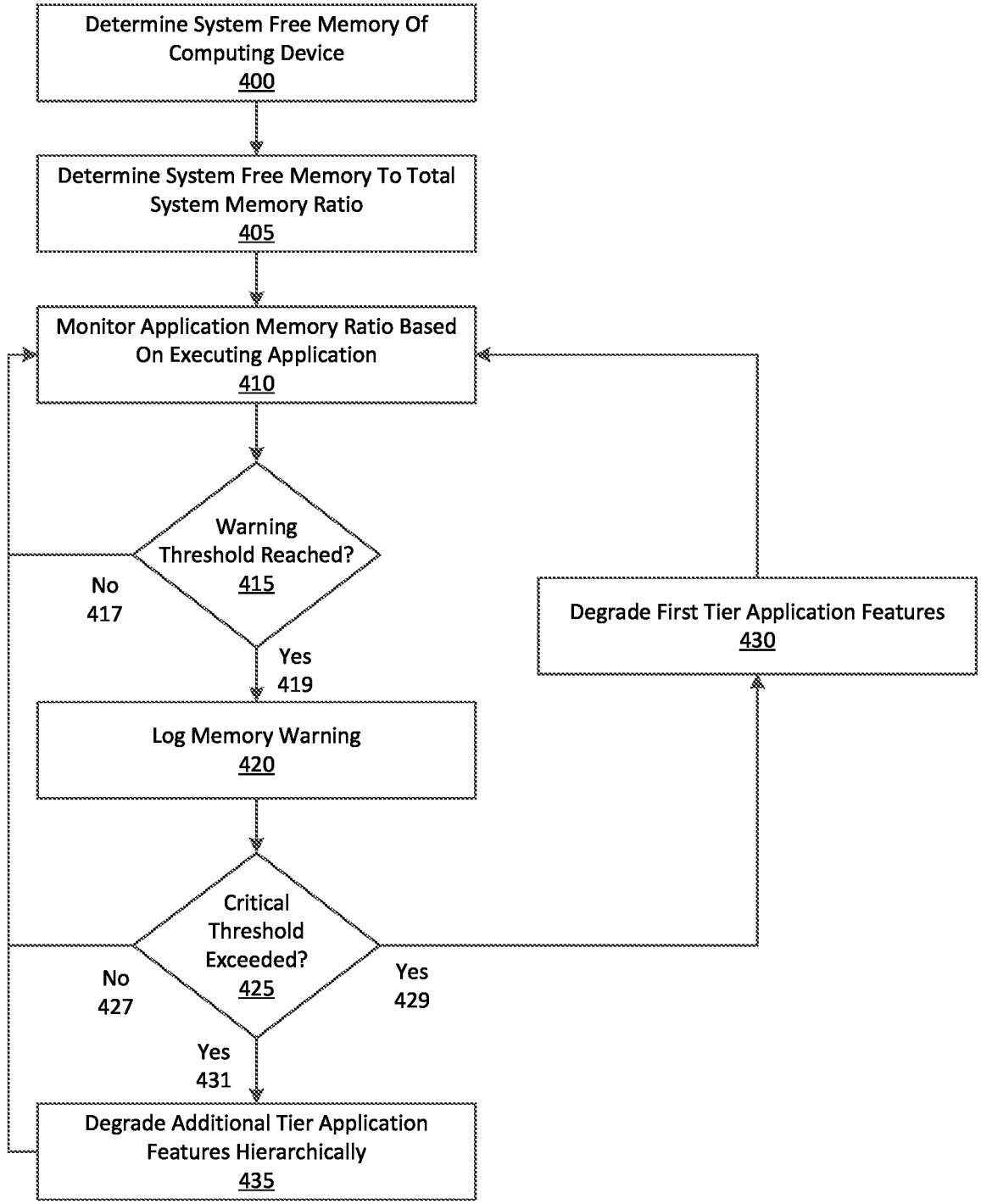

Methodology FIGS. 3 and 4 are block diagrams illustrating example methods of managing memory usage for an executing application on a computing device, according to examples described herein. In the below descriptions of FIGS. 3 and 4, reference may be made to reference characters representing like features as shown and described with respect to FIGS. 1 and 2.

Furthermore, the processes described in connection with FIGS. 3 and 4 may be performed by an example computing device 100 as shown and described with respect to FIG. 1. Referring to FIG. 3, the computing device 100 can monitor a set of memory usage metrics of the computing device 100 (300). As described herein, the memory usage metrics can comprise a the size of memory currently used by an executing application, the total system free memory of the computing device 100, and/or the system free memory to total system size ratio.

In various implementations, the computing device 100 can analyze historical memory usage data 134 of the computing device 100 (305). Specifically, the computing device 100 can analyze the historical memory usage data of the executing application (307). In certain aspects, the historical data 134 can comprise previous application usage sessions by the user, or can comprise a set amount of time prior to the present (e.g., the past N seconds) (309). Based on the set of memory usage metrics and the historical data 134, the computing device 100 can determine or predict whether a critical memory threshold will be exceeded (e.g., in the next twenty seconds) (310). For example, the computing device 100 can utilize the historical memory usage data 134, current usage data 132 can the current memory metrics to predict whether the critical memory threshold will be exceeded at a future instance in time. It is contemplated that such a determination can comprise a probabilistic calculation, and a "yes" can comprise a probability above a certain threshold (e.g., 90%), whereas a "no" can be anything below the threshold.

If the computing device determines that the critical memory threshold will not be exceeded (312), then the computing device 100 can continue to monitor the set of memory usage metrics accordingly (300). However, if the computing device determines that the critical memory threshold will be exceeded (314), then the computing device

100 can degrade and/or deactivate certain features of the executing application (315). For example, the computing device 100 can reduce a content render rate for the application (316), shut down one or more memory intensive features (317), and/or reduce a resolution of content on the display 160 (318).

FIG. 4 is a flow chart describing another example method of managing memory usage of an executing application given current and/or historical memory usage data, according to various examples. Referring to FIG. 4, the computing device 100 can determine a system free memory of the computing device 100 (400). The computing device 100 can further periodically or continuously determine a ratio of system free memory to total memory for the computing device 100 (405). The computing device 100 can monitor the ratio based on a set of hierarchical memory pressure level thresholds (410). In one example, the computing device 100 can monitor a ratio of the amount of memory being used by the executing application versus the system free memory available on the computing device 100. Additionally or alternatively, the computing device 100 can include an OS memory usage warning system, which can be utilized to predict whether one or more memory pressure thresholds will be exceeded. Based at least in part on the memory usage ratio, the computing device 100 can determine or predict whether a first memory pressure threshold will be exceeded at a future instance in time (415). If not (417), then the computing device 100 can continue to monitor the ratio and/or other memory metrics accordingly (410).

However, if a first memory pressure threshold is predicted to be exceeded (419), then the computing device 100 can degrade and/or deactivate a set of first tier application features, as described herein (430). The computing device 100 may then continue to monitor the memory metrics and/or memory usage ratio (410). The computing device 100 may determine whether a next memory pressure threshold will be exceeded at a future instance (415). If not (417), then the computing device 100 will continue monitoring (410). However, if so (429), then the computing device 100 can degrade and/or deactivate a next hierarchy of application features (435). The computing device 10 may then continue the monitoring accordingly (410).

It is contemplated that the loop from process steps (435), (410), and (415) can continue until the threat of an out-of-memory crash is alleviated, or until the computing device 100 returns to nominal memory conditions. It is further contemplated that the memory pressure thresholds need not be exceeded sequentially, but rather a prediction can indicate that any memory pressure threshold will be exceeded at a future instance, and can perform the memory reduction actions on all corresponding hierarchically tiered application features, as described herein.

Hardware Diagram

Figure 5:
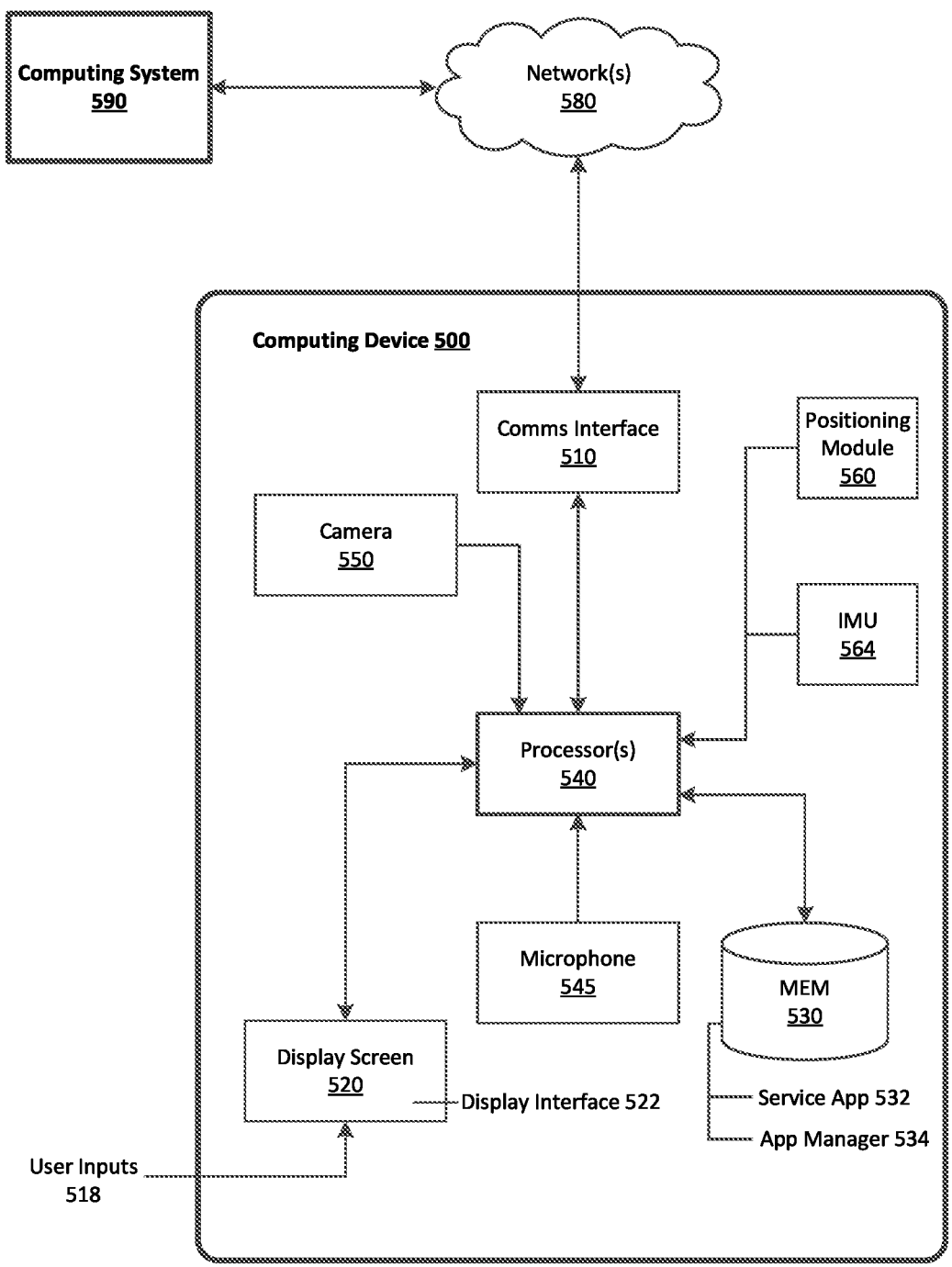
FIG. 5 is a block diagram that illustrates a computing device upon which examples described herein may be implemented.

FIG. 5 is a block diagram that illustrates a computing device upon which examples described herein may be implemented. In various implementations, the computing device 500 can comprise a mobile computing device, such as a smartphone, tablet computer, laptop computer, VR or AR headset device, and the like. As such, the computing device 500 can include telephony features such as a microphone 545, a camera 550, and a communication interface 510 to communicate with external entities using any number of wireless communication protocols. The computing device 500 can further include a positioning module 560 (e.g., a GPS receiver) and an inertial measurement unit 564 that includes one or more accelerometers, gyroscopes, or magnetometers.

In certain aspects, the computing device 500 can store a service application 532 and an application manager 534 in a local memory 530. In variations, the memory 530 can store additional applications executable by one or more processors 540 of the computing device 500, enabling access and interaction with one or more host servers over one or more networks 580. In certain examples, the application manager 534 can comprise memory monitoring and application managing functionality as described throughout the present disclosure. Furthermore, the application manager 534 may be a component of the service application 532 itself, or integrated as a memory management feature of the service application 532. In such examples, the application manager 534 can receive, as input, memory warnings from an OS low memory warning system of the computing device 500, as well as memory usage metrics of the service application 532 (e.g., historical memory usage data and current memory usage data).

In variations, the application manager 534 can comprise a component of the operating system of the computing device 500. As such, it is contemplated that the application manager 534 can function to monitor all executing applications on the computing device 500 can implement memory management techniques described herein for each executing application.

In response to a user input 518 by a user (e.g., the selection of an icon representing the designated application 532), the service application 532 can be executed by a processor 540, which can cause a display interface 522 to be generated on a display screen 520 of the computing device 500. In various implementations, the display interface 522 can enable a user to view and/or interact with displayed content on the display interface 522. Furthermore, the application manager 534 can be initiated based on the service application 532 being launched.

In various examples, the positioning module 560 can provide location data indicating the current location of the user to the remote computing system 590 (e.g., a host server for the service application 532) to, for example, enable the computing system 590 to provide the display interface 522 with content of the service application 532. In further implementations, the computing device 500 can also transmit additional sensor data to the computing system 590, such as image data from the camera 550, audio data from the microphone 545, and IMU data from the IMU 564 (e.g., continuously or periodically).

Examples described herein are related to the use of the computing device 500 for implementing the techniques described herein. According to one example, those techniques are performed by the computing device 500 in response to the processor 540 executing one or more sequences of one or more instructions contained in the main memory 530. Such instructions may be read into the main memory 530 from another machine-readable medium, such as a storage device. Execution of the sequences of instructions contained in the main memory 530 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing device comprising:
    one or more processors; and
    one or more memory resources storing instructions that, when executed by the one or more processors, cause the computing device to:
        while a client-side application is executing on the computing device, monitor a set of memory usage metrics of the computing device, wherein the client-side application enables a user to access one or more network-based services and comprises multiple priority tiers of application features;
        based on the set of memory usage metrics of the computing device, determine whether memory usage will exceed a critical memory threshold within a future period of time; and
        in response to determining that the memory usage will exceed the critical memory threshold within the future period of time, degrade a first set of application features of the client-side application, the first set of application features corresponding to a lowest priority tier of the multiple priority tiers.

2. The computing device of claim 1, wherein the executed instructions further cause the computing device to:
    display streaming content of the client-side application on a display screen of the computing device;
    wherein the executed instructions cause the computing device to degrade the first set of application features by reducing a content render rate of the streaming content.

3. The computing device of claim 1, wherein the set of memory usage metrics comprises a total memory size of the computing device and a current available memory of the computing device.

4. The computing device of claim 1, wherein the executed instructions cause the computing device to collect historical memory usage data for the computing device over a predetermined period prior to determining whether memory usage will exceed the critical memory threshold within the future period of time.

5. The computing device of claim 4, wherein the executed instructions cause the computing device to determine whether the memory usage will exceed the critical memory threshold within the future period of time by projecting the historical memory usage data and current memory usage data over the future period of time.

6. The computing device of claim 1, wherein the executed instructions further cause the computing device to:
    while or subsequent to degrading the first set of application features, determine that the memory usage will still exceed the critical memory threshold within the future period of time; and
    based on determining that the memory usage will still exceed the critical memory threshold within the future period of time, degrade a second set of application features in a second priority tier of the multiple priority tiers.

7. The computing device of claim 1, wherein the client-side application comprises a driver application for a rideshare service, and wherein the multiple priority tiers comprises at least one priority tier that corresponds to navigation content features.

8. A method of crash prevention for a computing device, comprising:
    while a client-side application is executing on the computing device, monitoring a set of memory usage metrics of the computing device, wherein the client-side application enables a user to access one or more network-based services and comprises multiple priority tiers of application features;
    based on the set of memory usage metrics of the computing device, determining whether memory usage will exceed a critical memory threshold within a future period of time; and
    in response to determining that the memory usage will exceed the critical memory threshold within the future period of time, degrading a first set of application features of the client-side application, the first set of application features corresponding to a lowest priority tier of the multiple priority tiers.

9. The method of claim 8, further comprising:
    displaying streaming content of the client-side application on a display screen of the computing device;
    wherein the computing device degrades the first set of application features by reducing a content render rate of the streaming content.

10. The method of claim 8, wherein the set of memory usage metrics comprises a total memory size of the computing device and a current available memory of the computing device.

11. The method of claim 8, wherein the computing device collects historical memory usage data for the computing device over a predetermined period prior to determining whether memory usage will exceed the critical memory threshold within the future period of time.

12. The method of claim 11, wherein the computing device determines whether the memory usage will exceed the critical memory threshold within the future period of time by projecting the historical memory usage data and current memory usage data over the future period of time.

13. The method of claim 8, further comprising:
    while or subsequent to degrading the first set of application features, determining that the memory usage will still exceed the critical memory threshold within the future period of time; and
    based on determining that the memory usage will still exceed the critical memory threshold within the future period of time, degrading a second set of application features in a second priority tier of the multiple priority tiers.

14. The method of claim 8, wherein the client-side application comprises a driver application for a rideshare service, and wherein the multiple priority tiers comprises at least one priority tier that corresponds to navigation content features.

15. A computer-implemented method of operating a computing device, the method be performed by one or more processors of the computing device and comprising:

while a client-side application is executing on the computing device, monitoring a set of memory usage metrics of the computing device, wherein the client-side application enables a user to access one or more network-based services and comprises multiple priority tiers of application features;

based on the set of memory usage metrics of the computing device, determining whether memory usage will exceed a critical memory threshold within a future period of time; and in response to determining that the memory usage will exceed the critical memory threshold within the future period of time, degrading a first set of application features of the client-side application, the first set of application features corresponding to a lowest priority tier of the multiple priority tiers.

16. The method of claim 15, further comprising:

displaying streaming content of the client-side application on a display screen of the computing device;

wherein the one or more processor degrade the first set of application features by reducing a content render rate of the streaming content.

17. The method of claim 15, wherein the set of memory usage metrics comprises a total memory size of the computing device and a current available memory of the computing device.

18. The method of claim 15, wherein the one or more processors collect historical memory usage data for the computing device over a predetermined period prior to determining whether memory usage will exceed the critical memory threshold within the future period of time.

19. The method of claim 18, wherein the one or more processors determine whether the memory usage will exceed the critical memory threshold within the future period of time by projecting the historical memory usage data and current memory usage data over the future period of time.

20. The method of claim 15, further comprising:

while or subsequent to degrading the first set of application features, determining that the memory usage will still exceed the critical memory threshold within the future period of time; and based on determining that the memory usage will still exceed the critical memory threshold within the future period of time, degrading a second set of application features in a second priority tier of the multiple priority tiers.

* * * * *